(12) United States Patent
Brandin et al.

(10) Patent No.: US 12,039,871 B2
(45) Date of Patent: Jul. 16, 2024

(54) METHOD FOR OPERATING A TRANSPORTATION SYSTEM

(71) Applicants: Ningbo Geely Automobile Research & Development Co., Ltd., Ningbo (CN); Zhejiang Geely Holding Group Co., Ltd., Zhejiang (CN)

(72) Inventors: Magnus Brandin, Mölnlycke (SE); Markus Söderlund, Lerum (SE)

(73) Assignees: NINGBO GEELY AUTOMOBILE RESEARCH & DEV. CO., LTD., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 0 days.

(21) Appl. No.: 17/831,794

(22) Filed: Jun. 3, 2022

(65) Prior Publication Data

US 2022/0292986 A1    Sep. 15, 2022

Related U.S. Application Data

(63) Continuation of application No. PCT/CN2020/134643, filed on Dec. 8, 2020.

(30) Foreign Application Priority Data

Dec. 9, 2019  (EP) ..................................... 19214517

(51) Int. Cl.
  *G08G 1/00*   (2006.01)
  *B60W 30/16*  (2020.01)
  *B60W 30/18*  (2012.01)

(52) U.S. Cl.
  CPC ............... *G08G 1/22* (2013.01); *B60W 30/16* (2013.01); *B60W 30/18159* (2020.02);
  (Continued)

(58) Field of Classification Search
  CPC ....................................................... G08G 1/22
  See application file for complete search history.

(56) References Cited

U.S. PATENT DOCUMENTS

2007/0276600 A1  11/2007  King
2012/0161982 A1   6/2012  Musachio
(Continued)

FOREIGN PATENT DOCUMENTS

CN   103177596 A   6/2013
CN   105702059 A   6/2016
(Continued)

OTHER PUBLICATIONS

International Search Report from corresponding International Application No. PCT/CN2020/134643, dated Feb. 25, 2021, 3 pages.

*Primary Examiner* — Imran K Mustafa
(74) *Attorney, Agent, or Firm* — Tucker Ellis LLP

(57) ABSTRACT

A method for operating a transportation system having a first set and a second set of vehicle platoons vehicle platoons, each of the vehicle platoons has a lead vehicle and a plurality of vehicles following the lead vehicle. The method includes controlling the vehicle platoons with a control system, driving the first set of vehicle platoons along a first road and the second set of vehicle platoons along a second road that intersects the first road, increasing the distance, at the intersection, between a first vehicle platoon and a following second vehicle platoon of the first set of vehicle platoons driving along the first road, and controlling a vehicle platoon of the second set of vehicle platoons driving along the second road to pass the intersection in the gap between the last vehicle of the first vehicle platoon and the lead vehicle of the second vehicle platoon.

12 Claims, 5 Drawing Sheets

(52) U.S. Cl.
CPC ..... *B60W 2552/05* (2020.02); *B60W 2720/10* (2013.01); *B60W 2754/30* (2020.02)

(56) References Cited

U.S. PATENT DOCUMENTS

| | | | | |
|---|---|---|---|---|
| 2019/0051158 | A1* | 2/2019 | Felip Leon | G08G 1/096783 |
| 2019/0250639 | A1* | 8/2019 | Xu | G08G 1/096725 |

FOREIGN PATENT DOCUMENTS

| | | | |
|---|---|---|---|
| CN | 106846867 | A | 6/2017 |
| CN | 106875710 | A | 6/2017 |
| CN | 106997674 | A | 8/2017 |
| CN | 107240252 | A | 10/2017 |
| CN | 108475465 | A | 8/2018 |
| CN | 108877268 | A | 11/2018 |
| CN | 109410619 | A | 3/2019 |
| IN | 104882008 | A | 9/2015 |
| JP | 2010186413 | A | 8/2010 |
| JP | 2012068721 | A | 4/2012 |
| JP | 2016146130 | A | 8/2016 |
| WO | 2010103504 | A1 | 9/2010 |
| WO | 2019163262 | A1 | 8/2019 |
| WO | 2019163287 | A1 | 8/2019 |

\* cited by examiner

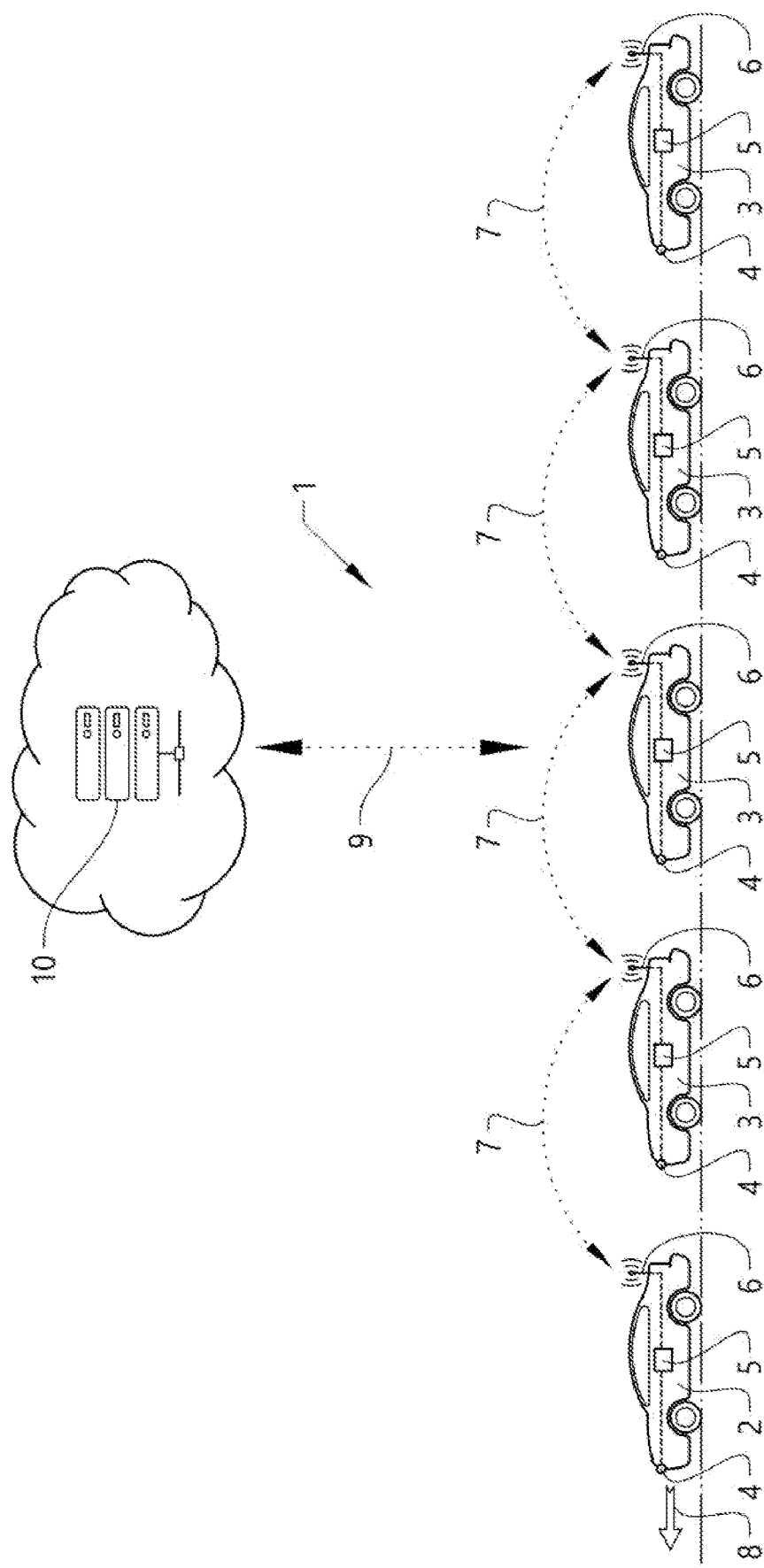

METHOD FOR OPERATING A TRANSPORTATION SYSTEM

RELATED APPLICATION DATA

This application is a continuation of International Patent Application No. PCT/CN2020/134643, filed Dec. 8, 2020, which claims the benefit of European Patent Application No. 19214517.5, filed Dec. 9, 2019, the disclosures of which are incorporated herein by reference in their entireties.

TECHNICAL FIELD

The invention relates to a method for operating a transportation system and a control system for controlling vehicles of a transportation system.

BACKGROUND

Today's transportation or traffic systems for transporting passengers have a relatively low capacity and public transport timetables often cannot be kept without delays. One way of trying to increase the capacity of the total traffic flow is to organize the vehicles in vehicle platoons, where each vehicle platoon has a lead vehicle and a plurality of following vehicles driving in a convoy after the lead vehicle.

There is however still a need for optimizing the use of such vehicle platoons and enabling vehicle platoons to pass intersections of a road network in an effective way for providing a relatively high throughput of vehicle platoons.

SUMMARY

An objective of the invention is to provide a method for operating a transportation system, by which method the throughput of vehicle platoons through an intersection of a road network can be increased.

The objective is achieved by a method for operating a transportation system comprising a first set of vehicle platoons and a second set of vehicle platoons, where each of the vehicle platoons has a lead vehicle and a plurality of vehicles following the lead vehicle, and the method comprises the steps of controlling the vehicle platoons by means of a control system, driving the first set of vehicle platoons along a first road and the second set of vehicle platoons along a second road, wherein the first road and the second road cross each other forming an intersection, and increasing the distance, at the intersection, between a first vehicle platoon and a following second vehicle platoon of the first set of vehicle platoons driving along the first road, and controlling a vehicle platoon of the second set of vehicle platoons driving along the second road to pass the intersection in the gap between the last vehicle of the first vehicle platoon and the lead vehicle of the second vehicle platoon.

The invention is based on the insight that by such a method, it is possible to provide a relatively high flow of vehicle platoons through an intersection of a road network. By use of the control system for synchronization of the vehicle platoons, the time gap between the vehicle platoons can be minimized and the driving can be planned for maintaining a relative high speed and avoiding any stoppage of any vehicle platoon. The time, speed and position of the vehicle platoons can be synchronized by the control system. This will also save energy since the deceleration and acceleration of the vehicle platoons required for passing the intersection, can be minimized.

According to one embodiment of the method, the method comprises the step of increasing the speed of the first vehicle platoon when the lead vehicle of the first vehicle platoon has entered the intersection, and/or decreasing the speed of the second vehicle platoon before the lead vehicle of the second vehicle platoon has reached the intersection. Hereby, the distance between the first vehicle platoon and the second vehicle platoon can be temporarily increased when passing the intersection, making it possible for another vehicle platoon driving along a crossing road to pass the intersection in an efficient and safe way in the gap between the first vehicle platoon and the second vehicle platoon. Before and after the intersection, the vehicle platoons can be driven with another optimized distance and time gap.

According to a further embodiment of the method, the method comprises the step of increasing the speed of the first vehicle platoon from a pre-intersection speed before the intersection to a post-intersection speed after the intersection. By selecting the difference between the pre-intersection speed and the post-intersection speed based on the frequency of vehicle platoons along the road, the distance and time gap between the first vehicle platoon and the second vehicle platoon driving along the first road can be adapted to the length and speed of the vehicle platoon driving along the second road. For example, the pre-intersection speed is suitably lower than the driving speed used before when the vehicle platoon approaches the intersection, and the post-intersection speed used immediately after the intersection is suitably higher than the driving speed used thereafter.

According to a further embodiment of the method, the method comprises the step of maintaining the post-intersection speed of the first vehicle platoon until the lead vehicle of the first vehicle platoon is at a predetermined distance after the intersection, and thereafter changing the speed of the first vehicle platoon to a driving speed. Hereby, it can be ensured that the distance and time gap will be sufficient for allowing the crossing vehicle platoon driving along the second road to pass the intersection.

According to a further embodiment of the method, the method comprises the step of maintaining the post-intersection speed of the first vehicle platoon until the last vehicle of the first vehicle platoon has passed the intersection, and thereafter changing the speed of the first vehicle platoon to a driving speed. Hereby, it can be ensured that the distance and time gap will be sufficient for allowing the crossing vehicle platoon driving along the second road to pass the intersection.

According to a further embodiment of the method, the method comprises the step of decreasing the speed of the second vehicle platoon when the lead vehicle of the second vehicle platoon is at a predetermined distance before the intersection. Hereby, it can be ensured that the distance and time gap will be sufficient for allowing the crossing vehicle platoon driving along the second road to pass the intersection.

According to a further embodiment of the method, the method comprises the step of decreasing the speed of the second vehicle platoon from a driving speed to a pre-intersection speed. Hereby, it can be ensured that the distance and time gap will be sufficient for allowing the crossing vehicle platoon driving along the second road to pass the intersection.

According to a further embodiment of the method, the method comprises the step of maintaining the pre-intersection speed of the second vehicle platoon until the lead vehicle of the second vehicle platoon has entered the intersection. Hereby, it can be ensured that the distance and time gap will be sufficient for allowing the crossing vehicle platoon driving along the second road to pass the intersection.

According to a further embodiment of the method, the method comprises the step of increasing the speed of the second vehicle platoon when the lead vehicle of the second vehicle platoon has entered the intersection. Hereby, the distance between the second vehicle platoon and a further following vehicle platoon can be temporarily increased when passing the intersection, making it possible for a further vehicle platoon driving along a crossing road to pass the intersection in an efficient and safe way in the gap between the second vehicle platoon and the further following vehicle platoon. Before and after the intersection, the vehicle platoons can be driven with another optimized distance and time gap.

According to a further embodiment of the method, the method comprises the step of increasing the speed of the second vehicle platoon from the pre-intersection speed before the intersection to a post-intersection speed after the intersection. By selecting the difference between the pre-intersection speed and the post-intersection speed based on the frequency of vehicle platoons along the road, the distance and time gap between the second vehicle platoon and a further following vehicle platoon driving along the first road can be adapted to the length and speed of a further vehicle platoon driving along the second road. For example, the pre-intersection speed is suitably lower than the driving speed used before when the vehicle platoon approaches the intersection, and the post-intersection speed used immediately after the intersection is suitably higher than the driving speed used thereafter.

According to a further embodiment of the method, the method comprises the step of maintaining the post-intersection speed of the second vehicle platoon until the lead vehicle of the second vehicle platoon is at a predetermined distance after the intersection, and thereafter changing the speed of the second vehicle platoon to a driving speed. Hereby, it can be ensured that the distance and time gap will be sufficient for allowing the crossing vehicle platoon driving along the second road to pass the intersection.

According to a further embodiment of the method, the method comprises the step of maintaining the post-intersection speed of the second vehicle platoon until the last vehicle of the second vehicle platoon has passed the intersection, and thereafter changing the speed of the second vehicle platoon to a driving speed. Hereby, it can be ensured that the distance and time gap will be sufficient for allowing the crossing vehicle platoon driving along the second road to pass the intersection.

According to a further aspect of the invention, a further objective of the invention is to provide a control system for controlling vehicles of a transportation system, by which control system the throughput of vehicle platoons through an intersection of a road network can be increased.

The objective is achieved by a control system for controlling vehicles of a transportation system comprising a first set of vehicle platoons and a second set of vehicle platoons, where each of the vehicle platoons has a lead vehicle and a plurality of vehicles following the lead vehicle, and the control system is configured to control the first set of vehicle platoons driving along a first road and the second set of vehicle platoons driving along a second road, wherein the first road and the second road cross each other forming an intersection, and the control unit is configured to increase the distance, at the intersection, between a first vehicle platoon and a following second vehicle platoon of the first set of vehicle platoons driving along the first road, and to control a vehicle platoon of the second set of vehicle platoons driving along the second road to pass the intersection in the gap between the last vehicle of the first vehicle platoon and the lead vehicle of the second vehicle platoon.

In addition, the invention relates to a transportation system comprising a first set of vehicle platoons and a second set of vehicle platoons, and such a control system. The invention also relates to a computer program comprising program code means for performing any method described herein.

The advantages of the control system, the transportation system and the computer program are similar to the advantages already discussed hereinabove with reference to some embodiments of the method.

Further advantages and advantageous features of the invention are disclosed in the following description and in the claims.

BRIEF DESCRIPTION OF THE DRAWINGS

With reference to the appended drawings, below follows a more detailed description of embodiments of the invention cited as examples.

In the drawings:

FIG. 1 shows a vehicle platoon,

DETAILED DESCRIPTION

Figure 2A:
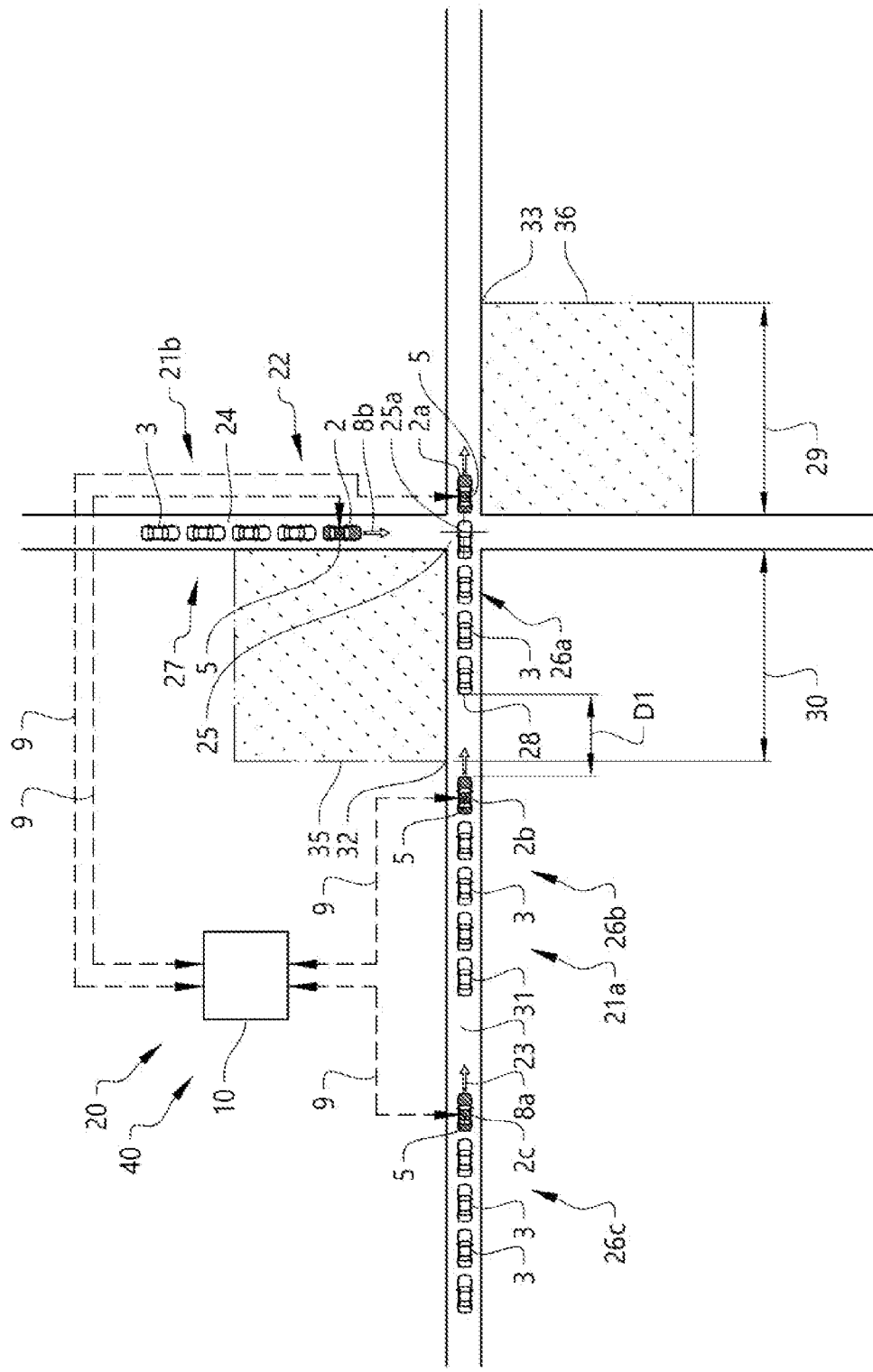
FIG. 2A shows a transportation system with a first set of vehicle platoons and a second set of vehicle platoons at an intersection, and a control system for controlling the vehicle platoons.

FIG. 1 shows a vehicle platoon 1 having a lead vehicle 2 and a plurality of following vehicles 3. The lead vehicle 2 and the following vehicles 3 are individual vehicles but driven together as a group or convoy. The following vehicles 3 are positioned in a line after the lead vehicle 2. The driving direction is indicated with an arrow 8. The lead vehicle 2 can be a so called autonomous or self-driving vehicle, or the lead vehicle 2 can be at least partly controlled by an operator of the lead vehicle. The following vehicles 3 of the vehicle platoon are suitably automatically controlled without any driver assistance. The vehicle platoon is suitably used for transportation of passengers of the vehicles, though the vehicles can also be used for transporting goods.

When driving in the vehicle platoon 1, the following vehicles 3 are controlled to follow the lead vehicle 2 or the vehicle closest to the front, such that when the speed of the lead vehicle 2 is increased/decreased the speed of the following vehicles 3 is increased/decreased correspondingly for maintaining or achieving the desired distances and time gaps between the vehicles. Further, when the lead vehicle 2 is changing driving direction, a following vehicle 3 will also change driving direction and follow the lead vehicle or rather the vehicle closest to the front.

For enabling the vehicles 2, 3 to be controlled, each vehicle can be provided with any suitable sensor equipment 4 for receiving information about the environment, and a control unit 5 for controlling the vehicle. The sensor equipment gives information about at least the vehicle closest to the front, but preferably the sensor equipment is covering 360 degrees around the vehicle for obtaining the information that is required for longitudinal and lateral control of the vehicle. Such sensor equipment 4 may comprise LIDAR, radar and ultrasonic sensors, cameras, etc. The information received by the sensor equipment is used by the control unit 5 for controlling the driving behaviour of the vehicle. In addition, maps, GPS, etc., can be used for determining the current position of a vehicle platoon or an individual vehicle of a vehicle platoon.

Alternatively or in addition to the sensor equipment 4, each vehicle 2, 3 is provided with a communication unit 6 for communicating with one or more of the other vehicles of the vehicle platoon 1. Such a communication unit 6 may comprise any suitable components for establish communication between the vehicles. For example, the communication unit 6 may comprise a transmitter and a receiver based on radio waves or microwaves. In other words, each vehicle can be part of a local network for communication 7 between the vehicles of the vehicle platoon 1. By means of the local network, control signals can be transmitted from one vehicle to another vehicle. The control signals received are then used by the control unit 5 arranged on the vehicle for controlling the driving behaviour of the vehicle. Such control signals received by the following vehicles 3 are preferably at least initially provided by the lead vehicle 2.

Such a vehicle platoon 1 of a transportation system is suitably part of a central network for communication 9 between the vehicle platoon 1 and a central control unit 10. By means of the central network, control signals can be transmitted from the central control unit 10 to the vehicle platoon 1 for controlling the driving behaviour of the vehicle platoon. Such control signals are preferably received by the lead vehicle 2 of the vehicle platoon, but could also be received by one or more of the following vehicles 3 of the vehicle platoon. The central control unit 10 can be part of a server of a wireless network, such as Internet, for cloud computing.

FIG. 2A shows a transportation system 20 which comprises a first set 21a of vehicle platoons and a second set 21b of vehicle platoons driving in a road network 22. The first set 21a of vehicle platoons may comprise two or more vehicle platoons, preferably several vehicle platoons. The second set 21b of vehicle platoons may comprise one or more vehicle platoons, preferably several vehicle platoons. In FIG. 2A, as an example only, three vehicle platoons 26a, 26b, 26c of the first set 21a of vehicle platoons are illustrated, and one vehicle platoon 27 of the second set 21b of vehicle platoons is illustrated. Each of the vehicle platoons has a lead vehicle 2, 2a, 2b, 2c and a plurality of vehicles 3 following the lead vehicle as described hereinabove.

The transportation system 20 further comprises a control system 40 configured to control the first set 21a of vehicle platoons driving along a first road 23 and the second set 21b of vehicle platoons driving along a second road 24.

The first road 23 and the second road 24 of the road network 22 cross each other such that an intersection 25 is formed. The intersection 25 constitutes a road section in common to the first road 23 and the second road 24. This road section comprises an intersection point 25a. In the example embodiment shown in FIG. 2A, the first set 21a of vehicle platoons are driving in a first direction 8a (from left to right) towards the intersection 25, and the second set 21b of vehicle platoons are driving in a second substantially perpendicular direction 8b (top to bottom) towards the intersection 25.

It should be stressed that the operation of the transportation system 20 described herein is preferably performed by controlling the vehicle platoons by means of the equipment and control units described herein, without any assistance from any driver of any of the vehicles.

A method for operating a transportation system comprising a first set of vehicle platoons and a second set of vehicle platoons, will be described with reference to FIGS. 2A, 2B, 2C and FIG. 3. In the figures, the first and second sets of vehicle platoons are illustrated at different time points.

The method comprises the steps of controlling the vehicle platoons by means of the control system 40, driving the first set 21a of vehicle platoons along the first road 23 and the second set 21b of vehicle platoons along the second road 24, increasing the distance, at the intersection 25, between a first vehicle platoon 26a and a following second vehicle platoon 26b of the first set 21a of vehicle platoons driving along the first road 23, and controlling a vehicle platoon 27 of the second set 21b of vehicle platoons driving along the second road 24 to pass the intersection 25 in the gap between the last vehicle 28 of the first vehicle platoon 26a and the lead vehicle 2b of the second vehicle platoon 26b. The following second vehicle platoon 26b is the first next vehicle platoon after the first vehicle platoon 26a.

In FIG. 2A, the gap or distance between the first vehicle platoon 26a and the second vehicle platoon 26b, i.e. between the last vehicle 28 of the first vehicle platoon 26a and the lead vehicle 2b of the second vehicle platoon 26b, is indicated with "D1". Both the distance and the time gap between the vehicle platoons can be increased at the intersection 25. The time gap is determined by the distance between the vehicle platoons and the speed of the vehicle platoons.

As also illustrated, the first vehicle platoon 26a has reached the intersection 25 and the lead vehicle 2a of the first vehicle platoon 26a has entered and just passed the intersection 25. In a position, when the lead vehicle 2a of the first vehicle platoon 26a has entered the intersection 25, the speed of the first vehicle platoon 26a can be increased for increasing the distance D1 between the first vehicle platoon 26a and the second vehicle platoon 26b at the intersection 25. The speed of the first vehicle platoon 26a can be increased from a pre-intersection speed before the intersection 25 to a post-intersection speed after the intersection 25. The post-intersection speed of the first vehicle platoon 26a can be maintained until the lead vehicle 2a of the first vehicle platoon 26a is at a predetermined distance 29 after the intersection 25, and thereafter the speed of the first vehicle platoon 26a can be changed to a driving speed. Alternatively, the post-intersection speed of the first vehicle platoon 26a can be maintained until the last vehicle 28 of the first vehicle platoon 26a has passed the intersection 25, and thereafter the speed of the first vehicle platoon 26a can be changed to the driving speed.

Further, the speed of the second vehicle platoon 26b can be decreased before the lead vehicle 2b of the second vehicle platoon 26b has reached the intersection 25, for increasing the distance D1 between the first vehicle platoon 26a and the second vehicle platoon 26b at the intersection 25. The speed of the second vehicle platoon 26b can be decreased when the lead vehicle 2b of the second vehicle platoon 26b is at a predetermined distance 30 before the intersection 25. The speed of the second vehicle platoon 26b can be decreased from the driving speed to the pre-intersection speed. The pre-intersection speed of the second vehicle platoon 26b is suitably maintained until the lead vehicle 2b of the second vehicle platoon 26b has entered the intersection 25.

Figure 2B:
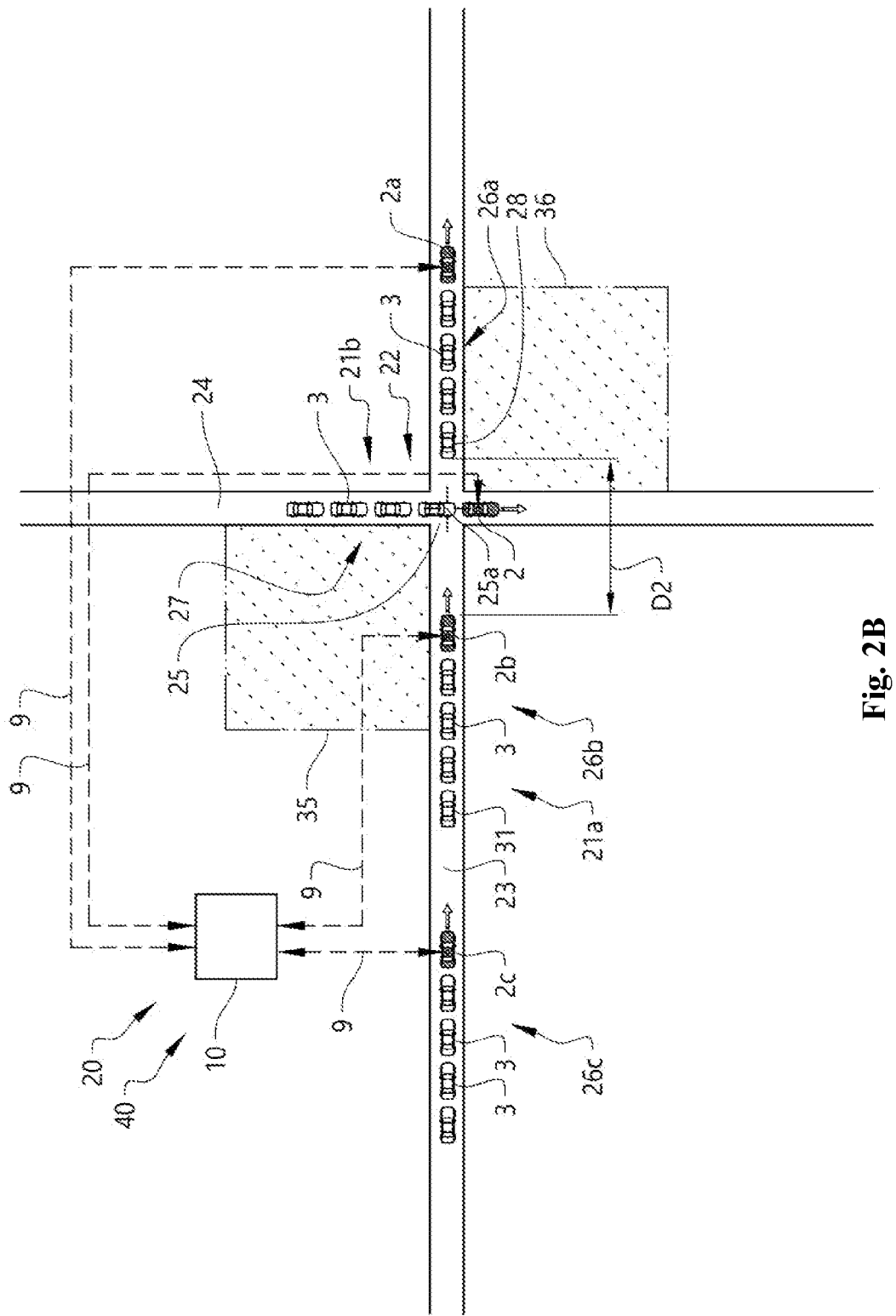
FIG. 2B shows the transportation system illustrated in FIG. 2A, where the first set of vehicle platoons and the second set of vehicle platoons have been moved relative to the intersection.
Figure 2C:
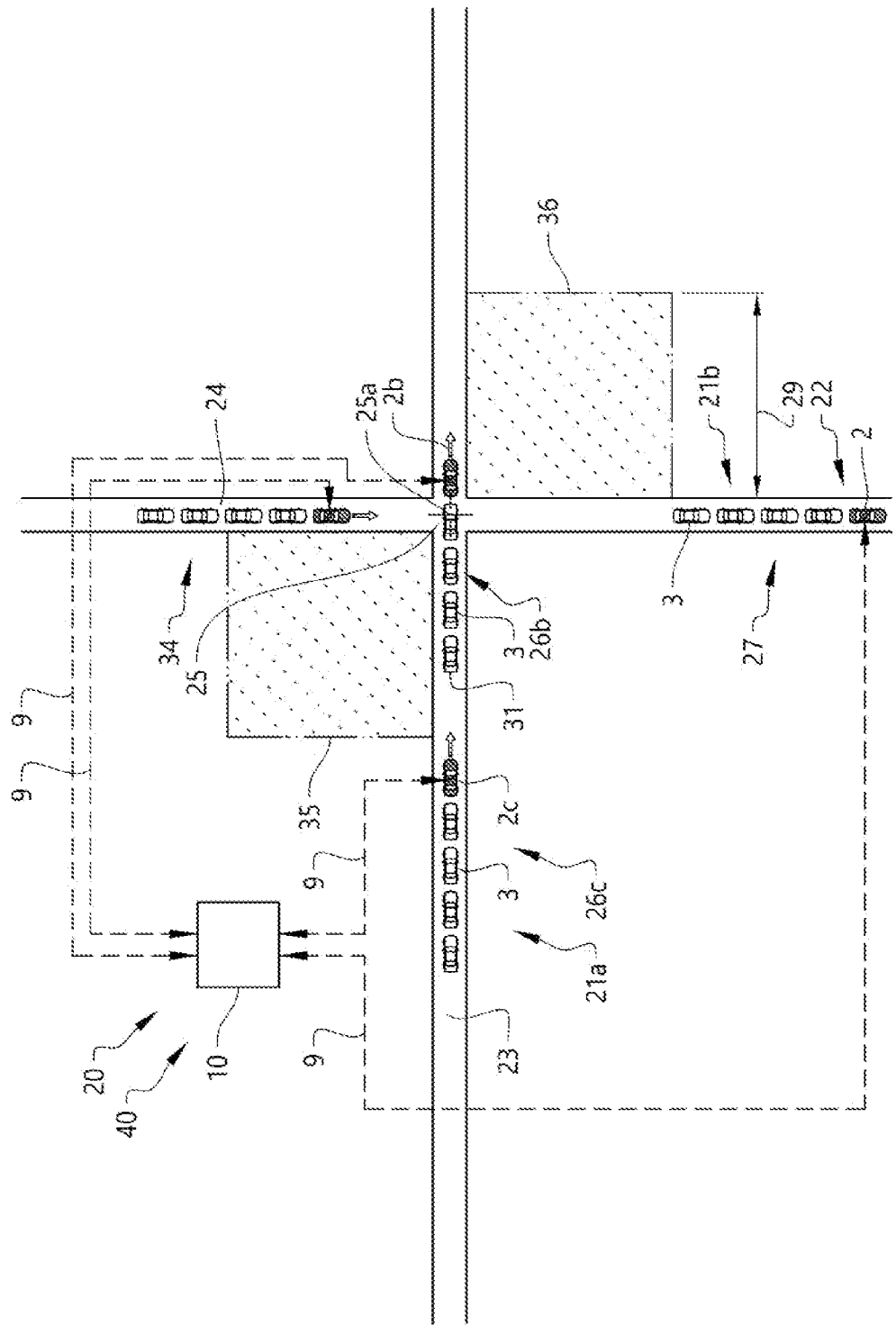
FIG. 2C shows the transportation system illustrated in FIG. 2A, where the first set of vehicle platoons and the second set of vehicle platoons have been further moved relative to the intersection.

In the example embodiment illustrated in FIGS. 2A, 2B and 2C, the first vehicle platoon 26a is driven with an increased speed along the predetermined distance 29 after the intersection 25, and the second vehicle platoon 26b is driven with a decreased speed along the predetermined distance 30 before the intersection 25, which means that the distance D1 between the first vehicle platoon 26a and the second vehicle platoon 26b is increased at the intersection 25. In FIG. 2A, the distance between the first vehicle platoon is represented by "D1", whereas in FIG. 2B, the distance is represented by "D2", where D2>D1. The gap or distance D2 will comprise the intersection position of the first road 23 and the second road 24 when the vehicle platoon 27 of the second set 21b of vehicle platoons driving along the second road 24 is passing the intersection 25 in the gap.

The first vehicle platoon 26a can be driven with a normal driving speed after the section where the first vehicle platoon has the post-intersection speed, and the second vehicle platoon 26b can be driven with a normal driving speed before the section where the second vehicle platoon has the pre-intersection speed. The normal driving speed outside the sections closest to the intersection 25 can be the same for the vehicle platoons, suitably a constant speed. The speeds can be selected such that the post-intersection speed is higher than the normal driving speed which in turn is higher than the pre-intersection speed.

Figure 3:
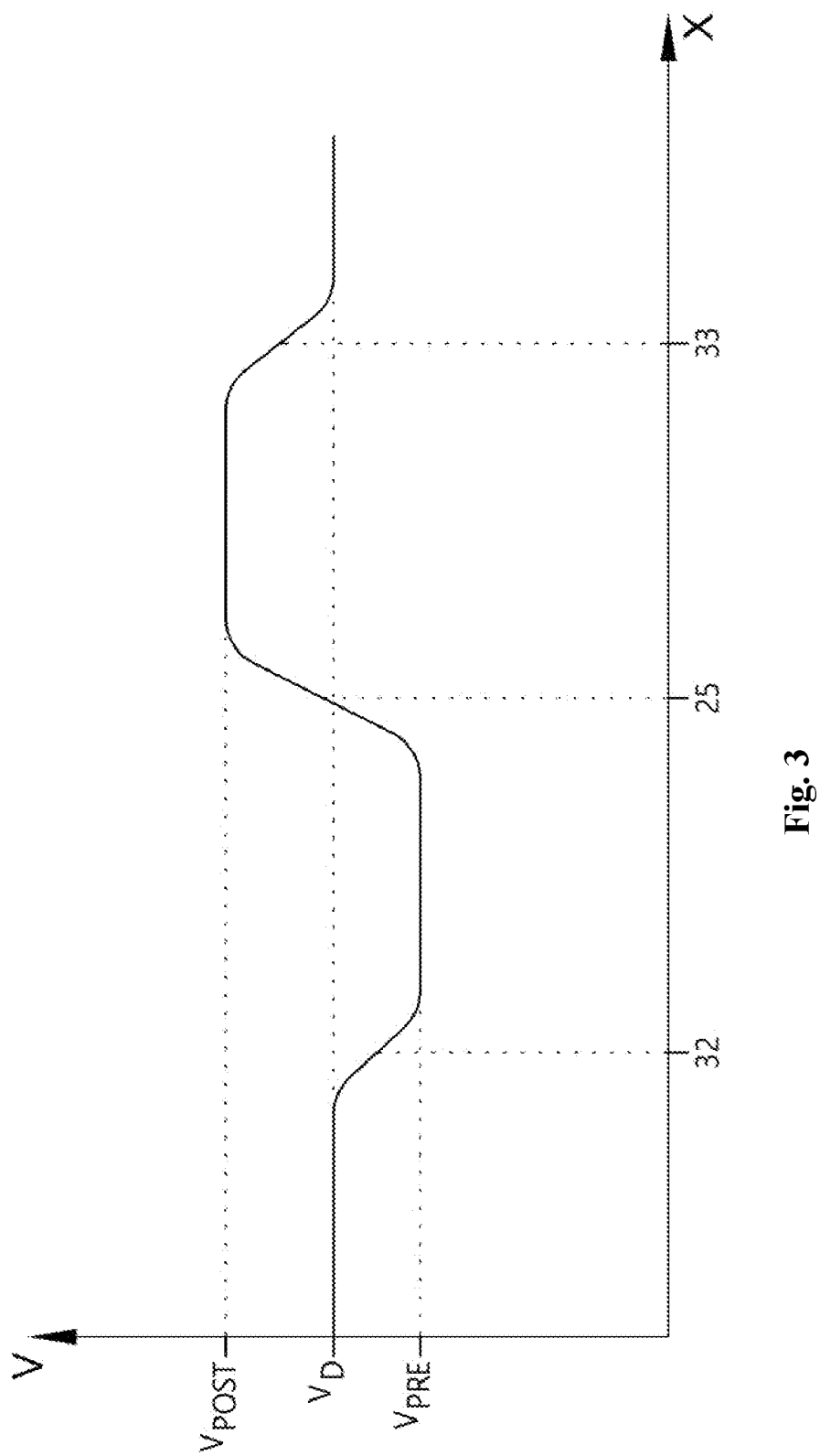
FIG. 3 shows a graph illustrating vehicle platoon speed versus vehicle platoon position.

FIG. 3 shows a graph illustrating an example of vehicle platoon speed "V" versus vehicle platoon position "X". At point 32, the speed is decreased from the driving speed VD to the pre-intersection speed VPRE, and at the intersection 25, the speed is increased from the pre-intersection speed VPRE to the post-intersection speed VPOST, and finally at point 33, the speed is decreased to the driving speed VD. See also FIG. 2A.

For creating an increased distance between the second vehicle platoon 26b and a following third vehicle platoon 26c of the first set 21a of vehicle platoons, the speed of the second vehicle platoon 26b can be increased when the lead vehicle 2b of the second vehicle platoon 26b has entered the intersection 25. See FIG. 2C. In the same way as previously described for the first vehicle platoon 26a, the speed of the second vehicle platoon 26b can be increased from the pre-intersection speed before the intersection 25 to a post-intersection speed after the intersection 25, and the post-intersection speed of the second vehicle platoon 26b can be maintained until the lead vehicle 2b of the second vehicle platoon 26b is at a predetermined distance 29 after the intersection 25 or until the last vehicle 31 of the second vehicle platoon 26b has passed the intersection 25, and thereafter the speed of the second vehicle platoon 26b can be changed to a driving speed. In other words; the procedure can be repeated for each vehicle platoon of the first set 21a of vehicle platoons for enabling a further vehicle platoon 34 of the second set 21b of vehicle platoons to pass the intersection 25 in a gap between two consecutive vehicle platoons of the first set 21a of vehicle platoons. Further, in FIG. 2C, the entire vehicle platoon 27 of the second set 21b of vehicle platoons has passed the intersection 25.

As previously mentioned with reference to FIG. 2B, the vehicle platoon 27 (hereinafter called the further vehicle platoon) of the second set 21b of vehicle platoons driving along the second road 24 is controlled to pass the intersection 25 in the gap D2 between the last vehicle 28 of the first vehicle platoon 26a and the lead vehicle 2b of the second vehicle platoon 26b.

In FIG. 2B, the lead vehicle 2 of the further vehicle platoon 27 has reached and passed the intersection 25. For shorten the time required for the further vehicle platoon 27 to pass the intersection 25 in the gap D2 between the first vehicle platoon 26a and the second vehicle platoon 26b, the speed of the further vehicle platoon 27 can be increased. In analogy with what has been described for the first vehicle platoon 26a, when the lead vehicle 2 of the further vehicle platoon 27 has entered the intersection 25, the speed of the further vehicle platoon 27 can be increased. In fact, the second set 21b of vehicle platoons can be driven in the same way as the first set 21a of vehicle platoons, using a pre-intersection speed before the intersection 25 and a post-intersection speed after the intersection 25, and suitably a normal driving speed outside the sections closest to intersection 25.

The flow of vehicle platoons passing the intersection 25 along the first road 23 and the flow of vehicle platoons passing the intersection 25 along the second road 24, can be synchronized such that alternating a vehicle platoon on the first road 23 and a vehicle platoon on the second road 24 will pass the intersection 25.

As also indicated in FIG. 2A, for example two vehicle platoon speed zones 35, 36 can be used. A first low speed zone 35 before the intersection (relative to the driving directions of the vehicle platoons) used for both the first set of vehicle platoons and the second set of vehicle platoons, which zone can be seen at top left closest to the intersection 25 in FIG. 2A, and/or a high speed zone 36 after the intersection (relative to the driving directions of the vehicle platoons) used for both the first set of vehicle platoons and the second set of vehicle platoons, which zone can be seen below right closest to the intersection 25 in FIG. 2A.

The size of such a zone and the speed increase and/or speed decrease used, are adapted to the distance and time gap between the vehicle platoons required for enabling a vehicle platoon on one road to pass the intersection between two consecutive vehicle platoons on the other road. A shorter zone will require a relatively high speed change and a longer zone will require a relatively low speed change.

With further reference to FIG. 2A, the invention also relates to a control system 40 for controlling a transportation system 20 comprising a first set 21a of vehicle platoons and a second set 21b of vehicle platoons, where each of the vehicle platoons has a lead vehicle and a plurality of vehicles following the lead vehicle. The control system is configured to control the first set 21a of vehicle platoons driving along a first road 23 and the second set of vehicle platoons 21b driving along a second road 24. The control unit is configured to increase the distance, at the intersection, between a first vehicle platoon 26a and a following second vehicle platoon 26b of the first set 21a of vehicle platoons driving along the first road 23, and to control a vehicle platoon 27 of the second set 21b of vehicle platoons driving along the second road 24 to pass the intersection 25 in the gap between the last vehicle 28 of the first vehicle platoon 26a and the lead vehicle 2b of the second vehicle platoon 26b.

The vehicle platoons can be synchronized before reaching the intersection 25 enabling the first vehicle platoon 26a, the vehicle platoon 27 of the second set 21b of vehicle platoons, and the second vehicle platoon 26b, to pass the intersection 25 one at the time in this order.

The control system 40 can be used for controlling the vehicle platoons in accordance with any of the example embodiments described herein.

The control system 40 can suitably comprise one or more central control units 10 and/or one or more of the local control units 5, which units can be used individually and in cooperation.

In the example embodiment illustrated in FIG. 2A, the control system 40 comprises a central control unit 10. The central control unit 10 is configured and arranged to communicate 9 with the vehicle platoons 26a, 26b, 26c, 27, preferably with the control unit 5 of the lead vehicle of each vehicle platoon, for controlling the driving of the vehicle platoons.

The central control unit 10 and the local control unit 5 arranged on a vehicle may comprise one or more microprocessors and/or one or more memory devices or any other components for mutual communication, and for communicating with other equipment. By means of the control units, the vehicle platoons can be controlled, and particularly computer programs to perform the method described herein can be executed. Thus, the central control unit and/or the local control unit is preferably provided with a computer program comprising program code means for performing the steps of any example embodiment of the method described herein.

Optionally, the control system may comprise a decentralized network of computers not necessarily arranged in one and the same central control unit.

Alternatively or in addition to what has been described hereinabove, sensors can be arranged in the environment to the current road where the vehicle platoons are driven. These sensors may provide information received by the control system. Such sensors could be a complement to the sensors of the vehicles for instance, giving further information and/or redundancy to the system.

It is to be understood that the present invention is not limited to the embodiments described above and illustrated in the drawings; rather, the skilled person will recognize that many changes and modifications may be made within the scope of the appended claims.

What is claimed is:

1. A method for operating a transportation system comprising a first set of vehicle platoons that drive along a first road and a second set of vehicle platoons that drive along a second road, the first road and the second road crossing each other forming an intersection, each of the vehicle platoons having a lead vehicle and a plurality of vehicles following the lead vehicle, the method comprising:
    controlling the vehicle platoons by means of a control system to increase a distance, at the intersection, between a first vehicle platoon and a following second vehicle platoon of the first set of vehicle platoons that are driving along the first road, by:
        increasing a speed of the first vehicle platoon when the lead vehicle of the first vehicle platoon has entered the intersection, and
        decreasing a speed of the second vehicle platoon before the lead vehicle of the second vehicle platoon has reached the intersection, without stopping the second vehicle platoon, and
    controlling a vehicle platoon of the second set of vehicle platoons that is driving along the second road to pass the intersection in a gap between the last vehicle of the first vehicle platoon and the lead vehicle of the second vehicle platoon while the second vehicle platoon is moving toward the intersection.

2. The method according to claim 1, wherein the speed of the first vehicle platoon is increased from a pre-intersection speed before the intersection to a post-intersection speed after the intersection.

3. The method according to claim 2, wherein the post-intersection speed of the first vehicle platoon is maintained until the lead vehicle of the first vehicle platoon arrives at a predetermined distance after the intersection, and thereafter changing the speed of the first vehicle platoon to a driving speed.

4. The method according to claim 2, wherein the post-intersection speed of the first vehicle platoon is maintained until the last vehicle of the first vehicle platoon has passed the intersection, and thereafter changing the speed of the first vehicle platoon to a driving speed.

5. The method according to claim 1, wherein the speed of the second vehicle platoon is decreased when the lead vehicle of the second vehicle platoon arrives at a predetermined distance before the intersection.

6. The method according to claim 1, wherein the speed of the second vehicle platoon is decreased from a driving speed to a pre-intersection speed.

7. The method according to claim 6, wherein the pre-intersection speed of the second vehicle platoon is maintained until the lead vehicle of the second vehicle platoon has entered the intersection.

8. The method according to claim 1, wherein the speed of the second vehicle platoon is increased when the lead vehicle of the second vehicle platoon has entered the intersection.

9. The method according to claim 6, wherein the speed of the second vehicle platoon is increased from the pre-intersection speed before the intersection to a post-intersection speed after the intersection.

10. The method according to claim 9, wherein the post-intersection speed of the second vehicle platoon is maintained until the lead vehicle of the second vehicle platoon is at a predetermined distance after the intersection, and thereafter changing the speed of the second vehicle platoon to a driving speed.

11. The method according to claim 9, wherein the post-intersection speed of the second vehicle platoon is maintained until the last vehicle of the second vehicle platoon has passed the intersection, and thereafter changing the speed of the second vehicle platoon to a driving speed.

12. A control system for controlling vehicles of a transportation system that has a first set of vehicle platoons that drive along a first road and a second set of vehicle platoons that drive along a second road, the first road and the second road crossing each other forming an intersection, each of the vehicle platoons having a lead vehicle and a plurality of vehicles following the lead vehicle, the control system comprising at least one control unit configured to:
    control the first set of vehicle platoons to increase a distance, at the intersection, between a first vehicle platoon and a following second vehicle platoon of the first set of vehicle platoons that are driving along the first road, including:
        increase a speed of the first vehicle platoon when the lead vehicle of the first vehicle platoon has entered the intersection, and
        decrease a speed of the second vehicle platoon before the lead vehicle of the second vehicle platoon has reached the intersection without stopping the second vehicle platoon, and
    control a vehicle platoon of the second set of vehicle platoons that is driving along the second road to pass the intersection in a gap between the last vehicle of the first vehicle platoon and the lead vehicle of the second vehicle platoon while the second vehicle platoon is moving toward the intersection.

* * * * *